United States Patent [19]

Segar et al.

[11] 4,043,436
[45] Aug. 23, 1977

[54] SUPPORT APPARATUS FOR ELECTRICALLY CONDUCTIVE RAIL

[75] Inventors: William R. Segar; Robert A. Larson, both of Monroeville, Pa.

[73] Assignee: Westinghouse Electric Corporation, Pittsburgh, Pa.

[21] Appl. No.: 684,057

[22] Filed: May 6, 1976

[51] Int. Cl.² .............................................. B60M 1/34
[52] U.S. Cl. ................................. 191/32; 191/22 R; 191/23 R; 191/22 C
[58] Field of Search ............ 104/246; 174/88 B, 99 B, 174/68 B, 70 B; 191/22 R, 22 C, 23 R, 29 R, 32, 40; 238/14.05, 14.2

[56] References Cited

U.S. PATENT DOCUMENTS

| | | |
|---|---|---|
| 3,341,670 | 9/1967 | Martin et al. .......................... 191/32 |
| 3,345,471 | 10/1967 | Kilburg .......................... 191/23 R X |
| 3,672,308 | 6/1972 | Segar .................................... 104/246 |
| 3,826,881 | 7/1974 | Spiringer .......................... 191/40 X |

FOREIGN PATENT DOCUMENTS 1,615,545  9/1970  Germany .............................. 191/32

*Primary Examiner*—Stephen G. Kunin
*Attorney, Agent, or Firm*—R. G. Brodahl

[57] ABSTRACT

A support apparatus is provided for supporting the electrically conductive power rails, ground rail and signal rail of a three-phase, five rail power collection apparatus operative with a fixed guideway transportation system including electrically propelled vehicles. The present rail support apparatus facilitates improved assembly and provides a substantial reduction of installation time and cost.

7 Claims, 5 Drawing Figures

SUPPORT APPARATUS FOR ELECTRICALLY CONDUCTIVE RAIL

CROSS-REFERENCE TO RELATED APPLICATION

Reference is made to U.S. patent application Ser. No. 684,058, of W. R. Segar and R. A. Larson filed concurrently herewith and entitled Power Collection Apparatus For A Transportation System, which application discloses power collection apparatus operative with the present support apparatus and is assigned to the same assignee as the present invention; the disclosure of this patent application is incorporated herein by reference.

In addition, reference is made to U.S. patent application Ser. No. 639,955, filed Dec. 11, 1975 by W. R. Segar and entitled Power Rail, Control Signal Rail and Guide Beam Arrangement For A Transportation System, which application discloses a prior art support apparatus for conductive rail and is assigned to the same assignee as the present invention.

BACKGROUND OF THE INVENTION

The disclosed invention relates to a support apparatus for one or more electrically conductive rails through which power and control signals are supplied to at least one vehicle operative with the roadway of a transportation system.

A transportation system employing at least one self-propelled rubber tired vehicle which traverses a roadway comprised of laterally spaced parallel tracks is generally described in Transit Expressway Report of MPC Corporation, 4400 Fifth Avenue, Pittsburgh, Pa. 15213 dated Feb. 20, 1967 and in U.S. Pat. No. 3,312,180 of E. O. Mueller. In these prior art transportation systems the vehicles are directed along the roadway by guide wheels depending from the bottom of each vehicle and traveling a guide beam supported parallel to the roadway tracks. Electric power is supplied to the vehicle through current collectors in contact with power rails mounted in relation to the guide beam or the roadway tracks. Control signals are supplied to the vehicle through antennas mounted on the roadway by adhesives. See also a published article entitled Transit Expressway — A New Mass Transit System in the Westinghouse Engineer for July 1965 at pages 98 to 103 and a published article entitled Passenger Transfer System Will Take The Long Walk Out Of Air Travel in the Westinghouse Engineer for January 1969 at pages 9 to 15.

In one power rail mounting arrangement known in the prior art, power rails were mounted in insulative brackets fixed to the roadway tracks such that the rail surfaces in contact with the collectors were in a horizontal plane. This prior art arrangement for mounting power rails required extensive adjustment at the installation site to obtain proper alignment between the rails and the collectors mounted on the vehicle, making this arrangement expensive and difficult to implement. A second power rail arrangement known in the prior art provided for bracketing the power rails to the lower flange of the guide beam, as shown in U.S. Pat. No. 3,672,308 of W. R. Segar, such that the rail surfaces in contact with the collectors were located below the horizontal plane of the vehicle guide wheels. This arrangement would allow the guide wheels to pass over the power rails and power could be provided to the vehicle as it traveled through roadway switches. However, since the power rails were also located close to the roadbed, this arrangement was susceptible to the accumulation of dirt and moisture on the collection surfaces of the rails.

SUMMARY OF THE INVENTION

The present invention relates to an improved support apparatus for one or more power, ground and control signal rails for providing power, control signals and grounding to at least one vehicle in a transportation system through collectors mounted on the vehicle. The support apparatus includes a rail support member, and a cooperative rail mounting member for each conductive rail, to provide a simpler and more economical installation by mounting each rail in a rail mounting member and fixing the latter to a predetermined insertion slot in the rail support member by locking fastener tabs designed to wedge the rail mounting member into the cooperative insertion slot. The rail support member is fastened to the upper flange of the guide beam which directs a vehicle along the roadway, and provides a predetermined position arrangement of said power, ground and control signal rails in relation to said guide beam.

PREFERRED EMBODIMENT OF THE INVENTION

Figure 1:
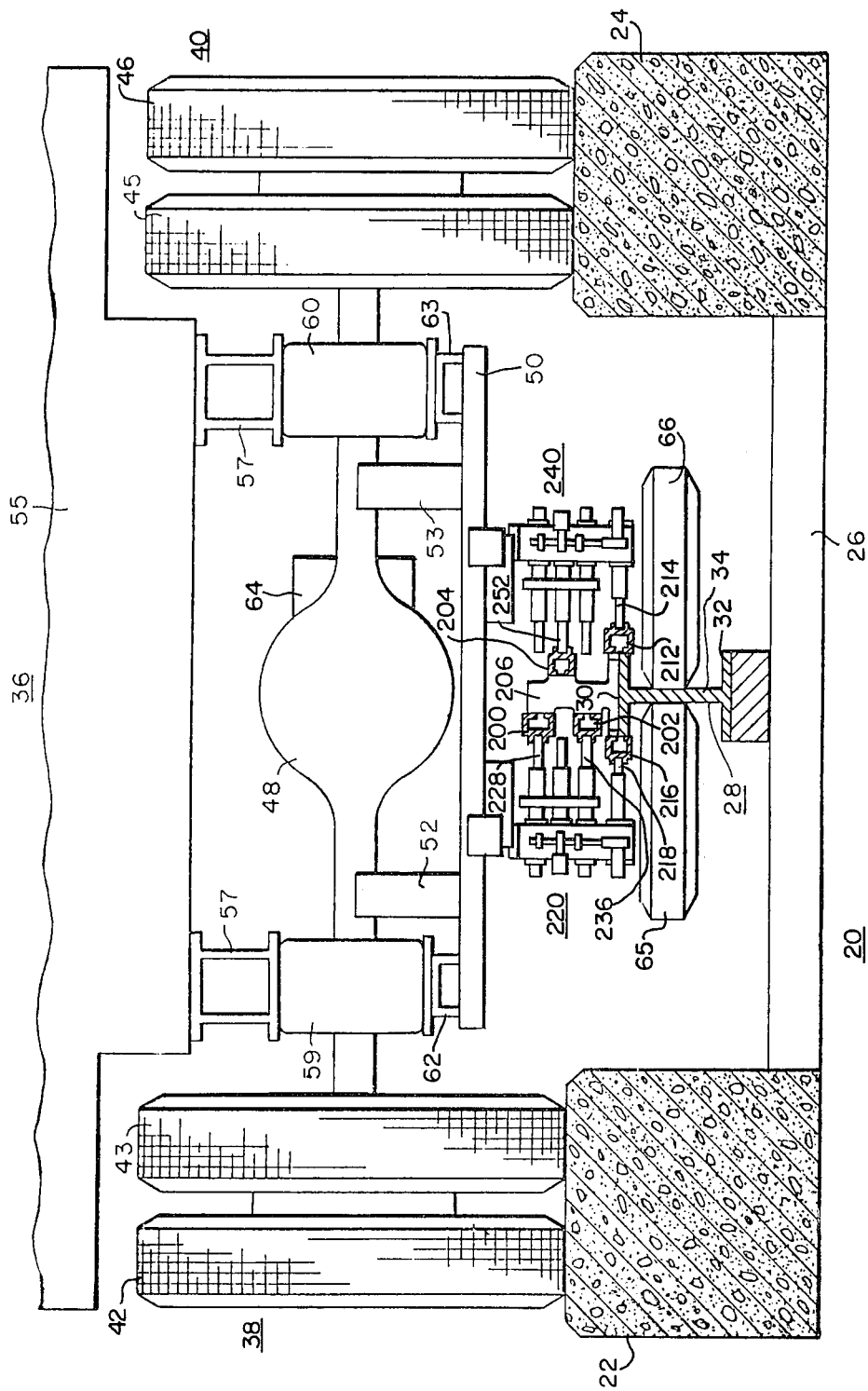
FIG. 1 is a cross-sectional view of a transportation system roadway taken in a plane perpendicular to the longitudinal axis of the roadway and showing the present rail support apparatus.

In FIG. 1 there is shown a cross-sectional view of a transportation system roadway taken in a plane perpendicular to the longitudinal axis of the roadway and showing the present rail support apparatus. The roadway 20 is comprised of laterally spaced concrete tracks 22 and 24 supported from a roadbed 26 and including a flanged guide beam 28 located between the tracks 22 and 24 and including upper and lower horizontal flanges 30 and 32 joined by a vertical web 34. A transportation vehicle 36 having a pair of resilient and laterally spaced vehicle main wheels 38 and 40 run on the tracks 22 and 24, respectively. The wheel 38 includes tires 42 and 43 and the wheel 40 includes tires 45 and 46. The vehicle 36 is provided with at least two such pairs of resilient and laterally spaced wheels fixed longitudinally along the vehicle. The wheel pair 38 and 40 is connected by an axle contained in an axle housing 48 which is fixed to the vehicle frame 50 by support brackets 52 and 53. The vehicle 36 is further provided with a body 55 mounted on a longitudinal frame 57 resiliently supported by suitable springs 59 and 60, such as air springs, mounted on channel members 62 and 63, which are mounted on the vehicle frame 50. The vehicle is powered by an electric motor 64 coupled to the axle connecting the wheels 38 and 40. For supplying electric power and control signals to the vehicle, power collector shoes 228, 236 and 252 are provided in contact with power rails 200, 202 and 204, respectively. A ground collector shoe 218 is shown in contact with ground rail 216 and control signal collector shoe 214 is shown in contact with control signal rail 212. The collector shoes 228 and 236 and 218 are carried by collector support apparatus 220 affixed to the vehicle frame 50. Collector shoes 252 and 214 are carried by collector support apparatus 240 affixed to the vehicle frame 50. Power rails 200, 202 and 204, ground rail 216 and signal rail 212 are insulatively supported by the rail support member 206 attached at predetermined longitudinal intervals in the order of every 5 feet along the upper flange 30 of the guide beam 28.

The arrangement shown in FIG. 1 for insulatively mounting the power rails 200, 202 and 204, ground rail 216 and signal rail 212 from the rail support member 206 fixed to the upper flange 30 of the guide beam 28 provides an improved power rail, ground rail and signal rail arrangement including more accurate and more convenient alignment between the respective rails and the cooperating collector shoes 228, 236, 252, 218 and 214. This arrangement provides additional economies in the installation of the rails by permitting simplified assembly of the rails in relation to the rail support members positioned along the guide beam for precise alignment and uniformity of the rail assembly in relation to the vehicles moving along the roadway 20.

Since the rail support member 206 projects above the upper flange 30 of the guide beam 28, the power rails 200, 202 and 204 are disposed above the roadbed 26 to make the power and control circuits less susceptible to interference caused by the accumulation of dirt or moisture on the power and signal rails. In addition, the power and signal rail arrangement disclosed in FIG. 1 illustrates that the collection surface of the individual rails is in a vertical plane which also serves to improve the power circuit and control circuit operation by decreasing susceptibility to the accumulation of dirt and moisture on the rail collection surfaces.

The power rail, signal rail, ground rail and guide beam arrangement of FIG. 1 maintains improved electrical contact between the vehicle collector shoes and the rail collection surfaces as the vehicle 36 experiences rolling and lateral forces, which for example may be exerted by wind or centrifugal force against the vehicle. Since the guide wheels 65 and 66 center the vehicle frame 50 over the web 34 of the guide beam 28, the longitudinal axis of rotation of the vehicle frame 50 is in the vertical plane of web 34 and above the surface of the tracks 22 and 24.

Figure 2:
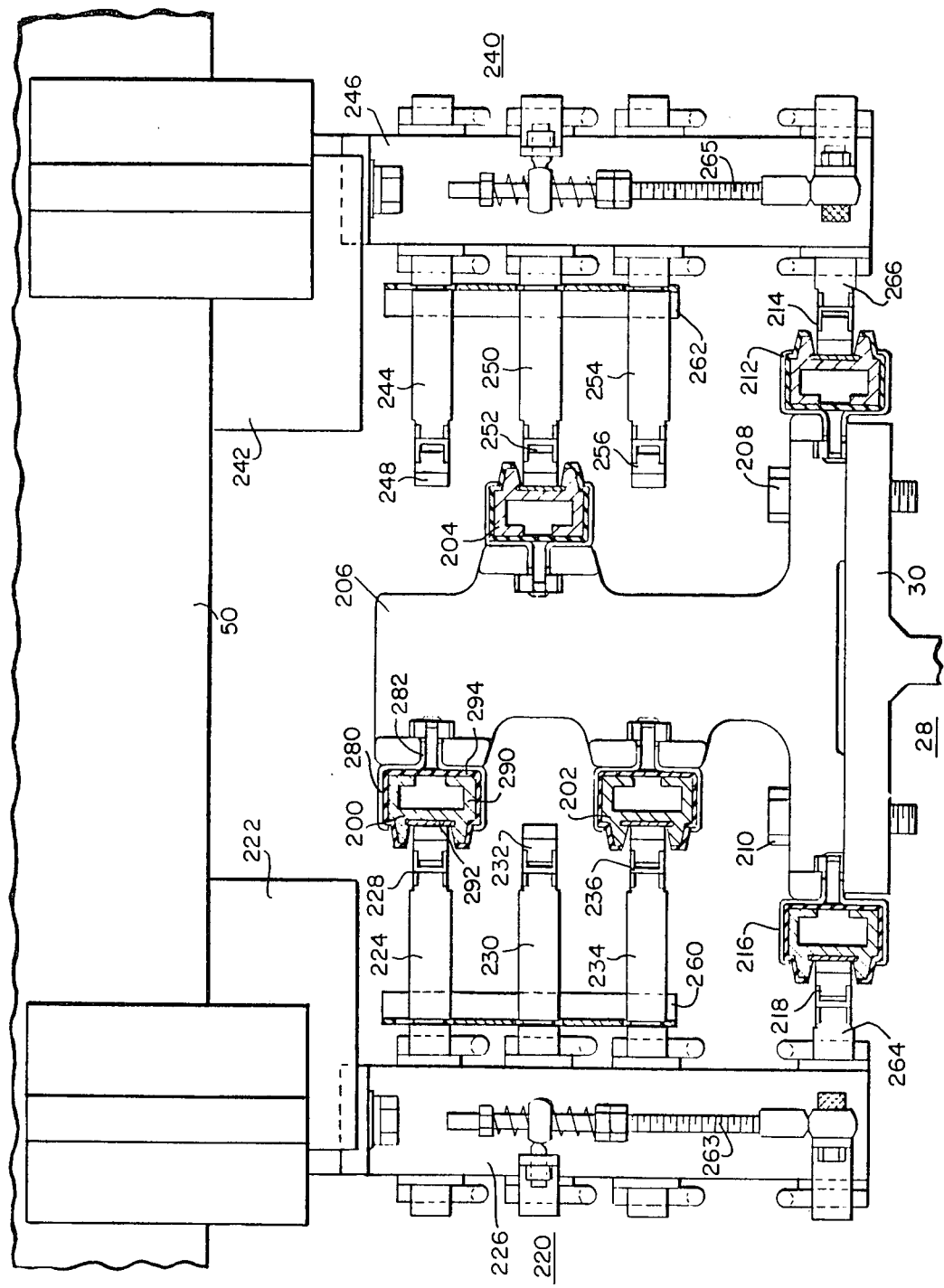
FIG. 2 is an enlarged end view of the present rail support apparatus showing the conductive rails and respective rail mounting members for providing power, control signals and grounding to the vehicle.

FIG. 2 provides an enlarged end view of the present rail support apparatus showing the conductive rail members for providing power and control signals to the vehicle. The power rails 200, 202 and 204 supply the propulsion current to the propulsion motor of the vehicle. The collector support apparatus 220 shown positioned at the left side of FIG. 2 and the vehicle, when the vehicle is moving forward into the plane of the drawing, includes a collector support member 226 mounted on a bushing 222 fastened to the vehicle frame 50. A first power collector arm 224 is pivotally fastened to the collector support member 226 and holds the collector shoe 228 operative with the power rail 200. A second power collector arm 230 is pivotally fastened to the collector support member 226 and holds the collector shoe 232 which is not operative with a power rail as shown in FIG. 2. A third power collector arm 234 is pivotally fastened to the collector support member 226 and holds the collector shoe 236 operative with the power rail 202. The collector support apparatus 240 positioned at the right side of the vehicle as shown in FIG. 2 includes a collector support member 246 mounted on a bushing 242 fastened to the vehicle frame 50. A fourth power collector arm 244 is pivotally fastened to the collector support member 246 and holds the collector shoe 248 which is not operative with a power rail as shown in FIG. 2. A fifth power collector arm 250 is pivotally fastened to the collector support member 246 and holds the collector shoe 252 operative with the power rail 204. A sixth power collector arm 254 is pivotally fastened to the collector support member 246 and holds the collector shoe 256 which is not operative with a power rail, as shown in FIG. 2, but would be for a reverse direction passage of the vehicle along the roadway. The power rails 200, 202 and 204 are held in position central to the guide beam 28 and in a triangular arrangement by the rail support member 206 to facilitate the movement of the vehicle in both directions along the guide beam 28. Control signals are provided to the vehicle through the signal rail 212 and the cooperative collector shoe 214 in communication with control equipment provided aboard the vehicle.

Figure 3:
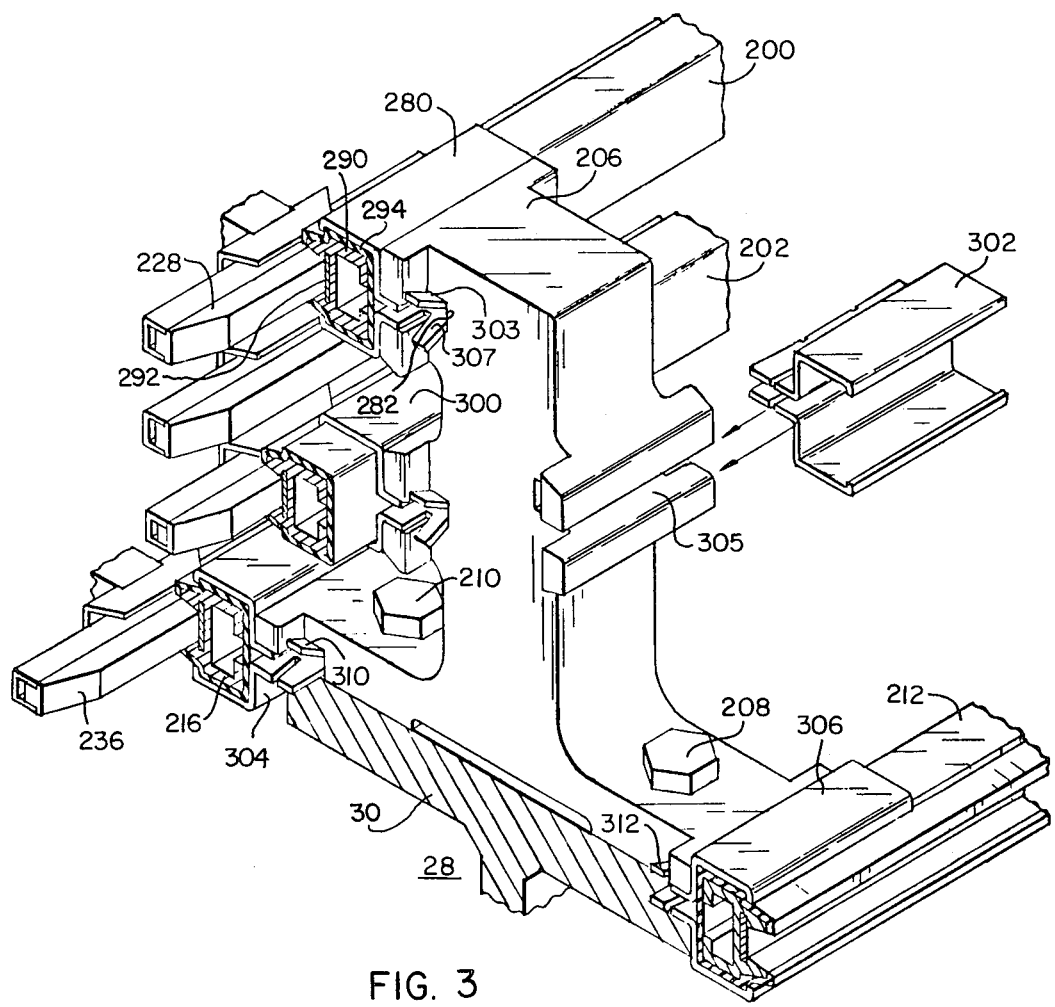
FIG. 3 is an isometric view of the present rail support apparatus.

The power rail 200 in FIG. 3 is operative with a rail mounting member 280 which slides into a slot 282 in the rail support member 206 and includes tabs 303 and 307 which are bent apart to wedge the rail mounting member 280 tightly against the rail support member 206 and to hold securely the power rail 200 in desired position thereby. The power rail 200 can include an aluminum conductive member 290 and a stainless steel collection face 292 surrounded by an electrically insulating jacket 294 such that the rail mounting member 280 can be made of metal whereas the rail support member 206 is made of electrically insulating material, such as an epoxy plastic. The collector shoe 228 can be made of a carbon and graphite material or copper graphite.

In FIG. 3 there is shown an isometric view of the rail support apparatus of the present invention including the rail support member 206 and the power rails 200 and 202 operative with their respective rail mounting members 280 and 300. Each of the rail mounting members 280, 300 and 302 includes four tabs, such as tabs 303 and 307 shown for member 280, which can be respectively separated at the opposite ends of the rail mounting member and operative to wedge the rail mounting member tightly into the insertion slot provided in the rail support member 206, such as slot 305, to provide a secure attachment between the rail mounting member 280 and the rail support member 206. The rail mounting member 304 operative with the ground rail 216 and the rail mounting member 306 operative with the signal rail 212 are fastened in their respective insertion slots by separating a single tab on both ends of the rail mounting member, such as a single tab 310 and 312 respectively, in cooperation with the upper surface of the top flange 30 of the guide beam 28.

Figure 4:
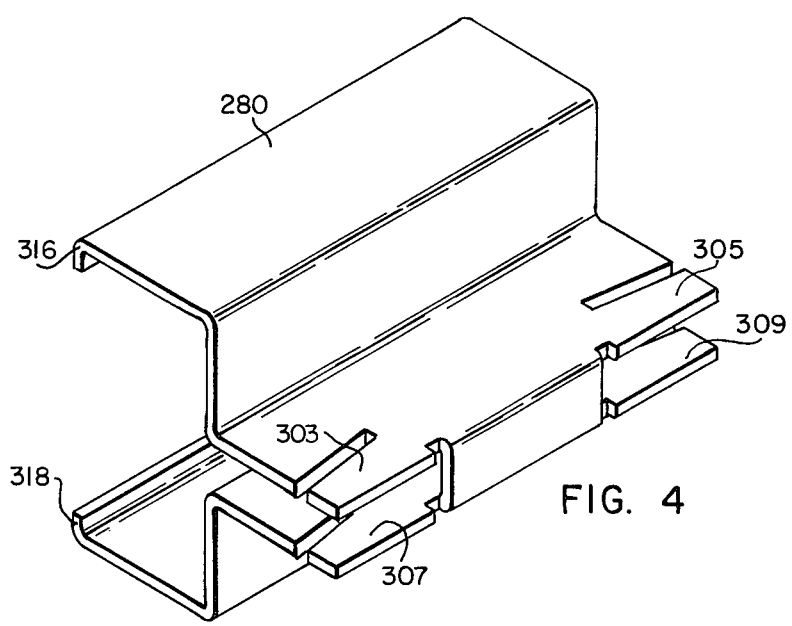
FIG. 4 is an isometric view of a rail mounting member included in the present rail support apparatus.

FIG. 4 is an isometric view of the rail mounting member 280 included with the present rail support apparatus. The rail mounting member 280 is shown in FIG. 4, and includes the locking tabs 303, 307, 305 and 309 which can be separated, as respective pairs of tabs 305 and 309 as one pair and 305 and 307 as the other pair, to wedge the rail mounting member 280 tightly in the insertion slot provided in the rail support member.

Figure 5:
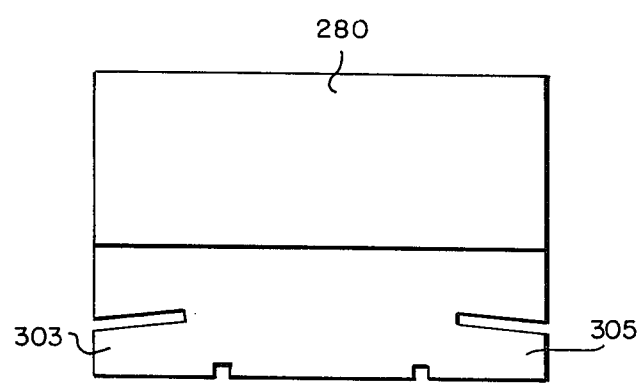
FIG. 5 is a top view of the rail mounting member.

In FIG. 5 there is shown an illustrative top view of the rail mounting member 280 showing the locking tab 303 at one end of the rail mounting member and a corresponding locking tab 305 at the opposite end of the rail mounting member 280. The rail mounting member is provided to clamp a power rail tightly to the rail support member and is designed to make unnecessary additional auxiliary mounting hardware. The rail mounting member 280 can have ends 316 and 318 shown in FIG. 4 opened up to accept a power rail and then closed over the power rail. The rail mounting member 280 is then inserted into an insertion slot provided in the rail support member, which insertion will return the rail mounting member 280 to its illustrated original shape. The rail mounting member 280 is then attached to the rail support member by separation of the integral locking tabs 303 and 307 at one end and 305 and 309 at the other end designed to wedge the rail mounting member securely into the insertion slot to thereby make unnecessary any additional mounting hardware. If desired, a manual bending tool can be used to bend the four locking tabs for each rail mounting member simultaneously to significantly reduce the time and cost of installing power rails to the provided rail support members along the top flange 30 of the guide beam 28, at approximately every 5 feet along the top flange of the guide beam where a rail support member is provided. The power rail can be supplied in longer sections in the order of 30 feet. If desired, a first operation can push the rail mounting member into an insertion slot in the rail support member and a second operation using a suitable tool can spread all four tabs at once to fasten a power rail to the rail support member. The rail mounting member includes tapered lugs as shown in FIG. 4 which when spread apart are operative to pull the rail tightly against the rail support member by a wedging action.

We claim:

1. A support apparatus for a conductive rail operative with a vehicle moving along a roadway including spaced tracks and a guide beam having an upper flange and supported between those tracks, said vehicle having an electric motor connected to a collector shoe, the combination of:

rail support means positioned above and coupled to the upper flange of said guide beam for positioning said rail substantially parallel to said spaced tracks such that said collector shoe cooperates with said rail to energize said motor, with said rail support means including an insertion slot, and rail mounting means coupled between said rail and said rail support means for holding said rail, with said rail mounting means including at least one fastener member having a predetermined shape operative with said insertion slot of said rail support means to fasten securely said rail to said rail support means.

2. The support apparatus of claim 1, operative with a plurality of conductive rails, with said rail support means including a plurality of insertion slots and with one of said rail mounting means being provided for each of said conductive rails and being coupled between that conductive rail and a different insertion slot in said rail support means.

3. The support apparatus of claim 1, with said rail being positioned by a plurality of said rail support means positioned above and coupled to the upper flange of said guide beam at predetermined locations along the length of said rail and with a different one of said rail mounting means being coupled between said rail and each of said plurality of rail support means.

4. The support apparatus of claim 1, with said rail support means including an insertion slot and with said fastener member being tapered in shape to be operative with said slot and adapted to be bent apart to wedge the rail mounting means against the rail support means.

5. The support apparatus of claim 1, with said rail mounting means having ends adapted to be opened to accept said rail and then be closed upon insertion of said rail mounting means into said slot for clamping said rail to said rail support means.

6. The support apparatus of claim 1, with said rail mounting means having fastener tabs which can be separated to wedge the rail mounting means into said insertion slot.

7. The support apparatus of claim 1, operative with a plurality of conductive rails, with a rail mounting means having fastener tabs provided for each conductive rail for holding the latter said rail, and with said rail support means including a different insertion slot for each of said rail mounting means and operative with the fastener tabs thereof for positioning said plurality of conductive rails in a predetermined arrangement relative to said roadway.

* * * * *